US009080070B2

(12) United States Patent
Paiz et al.

(10) Patent No.: US 9,080,070 B2
(45) Date of Patent: Jul. 14, 2015

(54) INKJET INK FOR PRINTING ON FLUOROPOLYMERS

(71) Applicant: Gem Gravure Company, Inc., West Hanover, MA (US)

(72) Inventors: Adam Paiz, Springfield, MO (US); Rick A. Elmer, Brookline, MO (US)

(73) Assignee: Gem Gravure Co., Inc., West Hanover, MA (US)

( * ) Notice: Subject to any disclaimer, the term of this patent is extended or adjusted under 35 U.S.C. 154(b) by 51 days.

(21) Appl. No.: 13/856,401

(22) Filed: Apr. 3, 2013

(65) Prior Publication Data

US 2013/0260037 A1 Oct. 3, 2013

Related U.S. Application Data

(60) Provisional application No. 61/619,688, filed on Apr. 3, 2012.

(51) Int. Cl.
*C09D 11/10* (2014.01)
*C09D 11/322* (2014.01)
*C09D 11/106* (2014.01)
*C09D 11/36* (2014.01)

(52) U.S. Cl.
CPC ............ *C09D 11/322* (2013.01); *C09D 11/106* (2013.01); *C09D 11/36* (2013.01)

(58) Field of Classification Search
CPC ........ C09D 11/30; C09D 11/36; C09D 11/40; C09D 11/52
USPC ........................... 524/544, 545, 546; 523/160
See application file for complete search history.

(56) References Cited

U.S. PATENT DOCUMENTS

| | | |
|---|---|---|
| 3,352,811 A | 11/1967 | Mille |
| 3,532,520 A | 10/1970 | Dawson at al. |
| 3,631,141 A | 12/1971 | Fang |
| 4,057,436 A | 11/1977 | Davies |
| 4,139,576 A | 2/1979 | Yoshimura et al. |
| 4,168,254 A | 9/1979 | Fell |
| 4,195,104 A | 3/1980 | Fell |

(Continued)

FOREIGN PATENT DOCUMENTS

| | | |
|---|---|---|
| DE | 2427827 | 12/1975 |
| DE | 2546629 | 4/1977 |

(Continued)

OTHER PUBLICATIONS

International Preliminary Report on Patentability for Int'l Application No. PCT/US00/10078; Date Completed: Sep. 9, 2001.

(Continued)

*Primary Examiner* — Vu A Nguyen
(74) *Attorney, Agent, or Firm* — Hamilton, Brook, Smith & Reynolds, P.C.

(57) ABSTRACT

A continuous inkjet ink composition includes a solvent, fluoropolymer, a fluorosurfactant, and a colorant. A conductivity salt can also be included. A dispersion resin and/or dispersant can also be included. The continuous inkjet ink is suitable for printing on a fluoropolymer substrate, such as poly(tetrafluoroethylene) (PTFE), with an inkjet printer and curing by heating. The ink can be made by mixing together the solvent, fluoropolymer, fluorosurfactant, and colorant, and optionally the conductivity salt, dispersion resin, and/or dispersant and filtering the mixture.

61 Claims, 2 Drawing Sheets

(56) References Cited

U.S. PATENT DOCUMENTS

| | | |
|---|---|---|
| 4,224,212 A | 9/1980 | Topham |
| 4,294,620 A | 10/1981 | Sappok |
| 4,313,766 A | 2/1982 | Barraclough et al. |
| 4,365,049 A | 12/1982 | Tsunoda et al. |
| 4,400,319 A | 8/1983 | Hari et al. |
| 4,548,986 A | 10/1985 | Suzuki et al. |
| 4,708,887 A | 11/1987 | Baxter et al. |
| 4,834,799 A | 5/1989 | Song |
| 4,892,775 A | 1/1990 | Song |
| 4,942,213 A | 7/1990 | Haubennestel et al. |
| 4,975,117 A | 12/1990 | Tabayashi et al. |
| 5,030,667 A | 7/1991 | Shimizu et al. |
| 5,168,013 A | 12/1992 | Tannenbaum |
| 5,168,107 A | 12/1992 | Tannenbaum |
| 5,188,764 A | 2/1993 | Shimizu et al. |
| 5,228,918 A | 7/1993 | Garand et al. |
| 5,230,961 A | 7/1993 | Tannenbaum |
| 5,453,122 A | 9/1995 | Lyon |
| 5,594,044 A | 1/1997 | Yang |
| 5,637,139 A | 6/1997 | Morelos et al. |
| 5,825,391 A | 10/1998 | Yang |
| 5,851,288 A | 12/1998 | Garand et al. |
| 5,912,280 A * | 6/1999 | Anton et al. .................. 523/161 |
| 6,010,564 A | 1/2000 | Zhu et al. |
| 6,048,471 A | 4/2000 | Henry |
| 6,071,564 A | 6/2000 | Marchetti et al. |
| 6,369,130 B1 * | 4/2002 | Zolotnitsky et al. .......... 523/210 |
| 6,596,816 B1 | 7/2003 | Haubennestel |
| 6,814,791 B2 | 11/2004 | Moore et al. |
| 7,432,316 B2 * | 10/2008 | Elmer et al. .................. 523/160 |
| 7,432,329 B2 | 10/2008 | Haubennestel et al. |
| 7,462,667 B2 | 12/2008 | Dadalas et al. |
| 7,465,759 B1 | 12/2008 | Salisbury et al. |
| 7,671,112 B2 | 3/2010 | Hintzer et al. |
| 7,674,928 B2 | 3/2010 | Peng et al. |
| 7,815,816 B2 | 10/2010 | Peng et al. |
| 8,222,322 B2 | 7/2012 | Hintzer et al. |
| 2002/0115781 A1 | 8/2002 | Pourreau et al. |
| 2011/0039077 A1 | 2/2011 | Klemann |
| 2012/0016070 A1 | 1/2012 | Usugaya et al. |

FOREIGN PATENT DOCUMENTS

| | | |
|---|---|---|
| EP | 0 117 054 | 8/1984 |
| EP | 0 753 552 A1 | 1/1997 |
| EP | 0 799 870 A2 | 10/1997 |
| FR | 2096885 | 7/1970 |
| GB | 2325670 | 12/1998 |
| WO | WO 92/08236 | 5/1992 |
| WO | WO 98/42774 | 10/1998 |
| WO | WO 00/63305 | 10/2000 |

OTHER PUBLICATIONS

Paiz, A. and Elmer, R., "Adhesion of Continuous Inkjet Inks on PTFE," International Wire & Cable Symposium, Proceedings of the 61$^{st}$ IWCS Conference, 684-687 (2012).

* cited by examiner

INKJET INK FOR PRINTING ON FLUOROPOLYMERS

RELATED APPLICATION

This application claims the benefit of U.S. Provisional Application No. 61/619,688, filed on Apr. 3, 2012. The entire teachings of the above application are incorporated herein by reference.

BACKGROUND OF THE INVENTION

Fluoropolymers are non-reactive plastics that are excellent insulators and are commonly used as exterior coatings on electrical wires. One particularly common fluoropolymer used to coat wires is poly(tetrafluoroethylene) (PTFE). Fluoropolymer wires can be used in demanding applications, such as aerospace, because they are chemically resistant. Additionally, PTFE is flame resistant and other fluoropolymers will only smoke rather than burn. Electrical wires may be labeled with some indicia printed on the exterior of the insulation, such as the manufacturer's name, lot number, product name, technical specification of the wire, or a colored identifying stripe. Thus, it is often necessary to print appropriate labeling on the wire prior to installation. However, many inks do not adhere sufficiently to the surface and can be worn away under normal use conditions.

Typically, such indicia are printed on fluoropolymer coatings with either solvent- or water-based contact inks using all-wheel printers (e.g., contact printers, bandmarkers, and off line printers). Some examples of known contact inks include the GEM 6000 series, the GEM 1100 series, and the GEM 1150 series, all manufactured by Gem Gravure Co., Inc. (West Hanover, Mass., USA). While many contact inks adhere to the PTFE, the use of all-wheel printers can have limitations. For example, the print wheel contacts the wire, and the pressure of this contact can damage the wire. Additionally, the printing wheels are laser engraved, so changing the message requires replacing the print wheel, which is expensive.

Thus, it is desirable to use a continuous inkjet printer to print indicia on a wire because the messages can be easily changed, the wire is not damaged by the pressure of the wheel, and less ink is required.

Continuous inkjet printing is a type of non-contact printing method where a conductive fluid is ejected under pressure through a small nozzle after it is perturbed by sonic waves from a vibrating piezo crystal. Common nozzle sizes are 42 micron, 55 micron, 60 micron, and 70 micron. The sonic waves cause the ink stream to separate into drops as the stream exits the nozzle, which are then charged. Different charges result in different drop placements as the drops are deflected by an electromagnetic field, thereby creating a pattern that forms an image. If the ink is not conductive, then the message can't be formed. Thus, a continuous inkjet printer requires conductive ink. Continuous inkjet printing differs from thermal inkjet printing, which is more commonly found in consumer and office inkjet printers. In a thermal inkjet printer, a pulse of current passes through a heating element to vaporize the ink to form a bubble, which is then propelled onto the target substrate. In contrast to continuous inkjet ink printers, thermal inkjet printers do not require a conductive ink formulation and are typically not suitable for use in a continuous inkjet ink printer.

In order for an ink to be used in an continuous inkjet printer, it should meet several characteristics. The viscosity should range between 1 cP (centipoise) to 10 cP at 25° C. The ink should, generally, have a conductivity value of at least 200 μS/cm. More preferably, the ink should have a conductivity value of at least 500 μS/cm. Even more preferably, the ink should have a conductivity value of at least 750 μS/cm. One of skill in the art will recognize that the conductivity value depends on the printer in which the ink is used. The ink also should be capable of passing through the filters of the printer. For example, a 15 mL sample of ink should be able to pass through a 2.7 micron WHATMAN GF/D filter in less than 5 minutes under an applied pressure of 10 inches of mercury (inHg). The ink typically should also separate into drops when agitated with a Piezo-electric crystal or drop-generator at about 1 kHz to about 200 kHz.

While PTFE dispersions can be used to coat metal, those dispersions are primarily found in aqueous compositions. However, solvent-based inks are generally preferred because they dry more quickly than aqueous-based inks Examples include U.S. Pat. Nos. 4,139,576; 4,400,319; 4,548,986; 5,030,667; 5,168,013; 5,168,107; 5,188,764; 5,230,961; 7,462,667; 7,671,112; and 8,222,322. There are, however, some known examples of PTFE dispersions in solvent. Examples include U.S. Pat. Nos. 3,352,811; 3,631,141; and 6,071,564.

While the PTFE dispersions in solvent have been used in wire marking, they typically are applied with a gravure wheel or other similar printing method and are not suitable for inkjet printing for at least two reasons. First, the drops may not separate sufficiently in an inkjet print head. Second, the particle size may be too large, which can cause the inkstream to wander and the nozzle to clog. In the inkjet printhead, once the stream of drops exits the nozzle, the stream needs to hit a consistent location on a solvent recovery device, which is called a gutter. The gutter sucks the drops back into the printer, so that the ink can be reused. If a large particle passes through the nozzle, but is not big enough to clog it, the pressure can change, causing the ink stream to move, which creates a mess and can shut down the printer. To prevent inkstream wandering and nozzle clogging from occurring, most inkjet manufacturers place a filter before the print head. If the filter clogs, then the printer will not operate.

Known ink jet inks often are unable to print on fluoropolymer surfaces for several reasons. For example, typically they do not sufficiently bind to fluoropolymer surfaces in order to withstand typical abrasive forces. They also tend to fail due to poor wetting ability and poor heat stability. Some examples of inkjet inks that are generally not suitable for printing on PTFE and other fluoropolymer surfaces include U.S. Pat. Nos. 7,465,759 and 7,432,316. One example of an inkjet ink with a fluorinated resin is U.S. Patent Publication No. 2011/0039077. This ink, however, may not be suitable for continuous inkjet printing because it is not sufficiently conductive.

Thus, there is a need for an improved inkjet ink formulation having improved adhesion to PTFE and other fluoropolymer surfaces.

SUMMARY OF THE INVENTION

Disclosed herein is an inkjet ink composition that includes a solvent, a fluoropolymer, a fluorosurfactant, and a colorant. The solvent can be methyl ethyl ketone, n-butyl acetate, and propylene glycol methyl ether acetate. The inkjet ink composition can further include a conductivity salt, which can be tetrabutyl ammonium nitrate, tetrabutyl ammonium hexafluorophosphate, and potassium thiocyanate. The colorant can be a black chrome complex azo dye, phthalocyanine green, phthalocyanine blue, carbon black, and titanium dioxide. The colorant can also be carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70. The fluoropolymer can be a copolymer of a fluoroolefin monomer and a vinyl ether monomer. The fluoroolefin monomer can be chlorotrifluoroethylene. The vinyl ether monomer can be a perfluoro(alkylvinylether). The fluoropolymer can be poly(tetrafluoroethylene), poly(tetrafluoethylene-co-hexafluoropropylene), poly(ethylene-co-tetrafluoroethylene), poly(tetrafluoroethylene-co-perfluorovinylether), and poly(vinylidene fluoride). The fluorosurfactant can be a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated non-ionic surfactant, a fluoro-alkyl ammonium chloride, an octylphenol ethoxylates. The inkjet ink can also include a dispersion resin, which can be a polyketone. The inkjet ink can also include a dispersant. The dispersant can be an amine functional hyperdispersant, a dispersion synergist, and a pigment synergist. The solvent can be present in a range of between about 40% to about 90% by weight of the inkjet ink composition. The fluoropolymer can be present in a range of between about 5% to about 40% by weight of the inkjet ink composition. The fluorosurfactant can be present in a range of between about 0.5% to about 5% by weight of the inkjet ink composition. The colorant can be present in a range of between about 5% to about 30% by weight of the inkjet ink composition. The conductivity salt can be present in a range of between about 1% to about 5% by weight of the inkjet ink composition. The dispersion resin can be present in a range of between about 0.1% to about 20% by weight of the inkjet ink composition. The dispersant is present in a range of between about 0.1% to about 10% by weight of the inkjet ink composition.

Disclosed herein is a method of making an inkjet ink. The inkjet ink is made by mixing together a solvent, a fluoropolymer, a fluorosurfactant, and a colorant. The resulting mixture is then filtered the mixture. The solvent can be methyl ethyl ketone, n-butyl acetate, and propylene glycol methyl ether acetate. The inkjet ink composition can further include a conductivity salt, which can be tetrabutyl ammonium nitrate, tetrabutyl ammonium hexafluorophosphate, and potassium thiocyanate. The colorant can be a black chrome complex azo dye, phthalocyanine green, phthalocyanine blue, carbon black, and titanium dioxide. The colorant can also be carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70. The fluoropolymer can be a copolymer of a fluoroolefin monomer and a vinyl ether monomer. The fluoroolefin monomer can be chlorotrifluoroethylene. The vinyl ether monomer can be a perfluoro(alkylvinylether). The fluoropolymer can be poly(tetrafluoroethylene), poly(tetrafluoethylene-co-hexafluoropropylene), poly(ethylene-co-tetrafluoroethylene), poly(tetrafluoroethylene-co-perfluorovinylether), and poly(vinylidene fluoride). The fluorosurfactant can be a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated non-ionic surfactant, a fluoro-alkyl ammonium chloride, an octylphenol ethoxylates. The inkjet ink can also include a dispersion resin, which can be a polyketone. The inkjet ink can also include a dispersant. The dispersant can be an amine functional hyperdispersant, a dispersion synergist, and a pigment synergist. The solvent can be present in a range of between about 40% to about 90% by weight of the inkjet ink composition. The fluoropolymer can be present in a range of between about 5% to about 40% by weight of the inkjet ink composition. The fluorosurfactant can be present in a range of between about 0.5% to about 5% by weight of the inkjet ink composition. The colorant can be present in a range of between about 5% to about 30% by weight of the inkjet ink composition. The conductivity salt can be present in a range of between about 1% to about 5% by weight of the inkjet ink composition. The dispersion resin can be present in a range of between about 0.1% to about 20% by weight of the inkjet ink composition. The dispersant is present in a range of between about 0.1% to about 10% by weight of the inkjet ink composition.

Disclosed herein is a method of printing on a fluoropolymer substrate. The method includes vibrationally generating drops of an inkjet ink, deflecting the inkjet ink drops onto a substrate, and curing the inkjet ink on the fluoropolymer substrate. The inkjet ink can include a solvent, a fluoropolymer, a fluorosurfactant, and a colorant. The fluoropolymer substrate can be poly(tetrafluoroethylene), poly(tetrafluoethylene-co-hexafluoropropylene), poly(vinylidene fluoride), or poly(ethylene-co-tetrafluoroethylene), or copolymers of tetrafluoroethylene. The step of curing can include heating the fluoropolymer substrate. The inkjet ink can be cured at about 400° C. for about 3 minutes. The inkjet ink can be cured between about 300° C. and about 650° C. for about between about 30 seconds to about 10 minutes. The solvent can be methyl ethyl ketone, n-butyl acetate, and propylene glycol methyl ether acetate. The inkjet ink composition can further include a conductivity salt, which can be tetrabutyl ammonium nitrate, tetrabutyl ammonium hexafluorophosphate, and potassium thiocyanate. The colorant can be a black chrome complex azo dye, phthalocyanine green, phthalocyanine blue, carbon black, and titanium dioxide. The colorant can also be carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70. The fluoropolymer can be a copolymer of a fluoroolefin monomer and a vinyl ether monomer. The fluoroolefin monomer can be chlorotrifluoroethylene. The vinyl ether monomer can be a perfluoro(alkylvinylether). The fluoropolymer can be poly(tetrafluoroethylene), poly(tetrafluoethylene-co-hexafluoropropylene), poly(ethylene-co-tetrafluoroethylene), poly(tetrafluoroethylene-co-perfluorovinylether), and poly(vinylidene fluoride). The fluorosurfactant can be a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoroethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated nonionic surfactant, a fluoro-alkyl ammonium chloride, an octylphenol ethoxylates. The inkjet ink can also include a dispersion resin, which can be a polyketone. The inkjet ink can also include a dispersant. The dispersant can be an amine functional hyperdispersant, a dispersion synergist, and a pigment synergist. The solvent can be present in a range of between about 40% to about 90% by weight of the inkjet ink composition. The fluoropolymer can be present in a range of between about 5% to about 40% by weight of the inkjet ink composition. The fluorosurfactant can be present in a range of between about 0.5% to about 5% by weight of the inkjet ink composition. The colorant can be present in a range of between about 5% to about 30% by weight of the inkjet ink composition. The conductivity salt can be present in a range of between about 1% to about 5% by weight of the inkjet ink composition. The dispersion resin can be present in a range of between about 0.1% to about 20% by weight of the inkjet ink composition. The dispersant is present in a range of between about 0.1% to about 10% by weight of the inkjet ink composition.

The inkjet inks disclosed herein provide numerous advantages over known inkjet and contact inks. For example, known inkjet inks typically do not adhere sufficiently to fluoropolymer surfaces. In contrast, the inkjet inks disclosed herein adhere more effectively to fluoropolymer surfaces and can withstand greater and/or more prolonged abrasive forces. For example, the inks exhibit improved durability when printed on PTFE-coated wire when tested according to a scratch test, a tape test, and/or United States Military Specification Mil-W-22759E, Section 4.6.3.4. Additionally, known contact inks typically are not suitable for use in a continuous inkjet printer, whereas the inkjet inks disclosed herein can be used in a continuous inkjet printer. Similarly, known inkjet inks cannot be used in a continuous inkjet printer, whereas the inks disclosed herein can be used in a continuous inkjet printer.

Without wishing to be bound by any particular theory, it is believed that the fluorosurfactant of the inkjet ink composition provides initial wetting of the fluoropolymer substrate and that the fluoropolymer of the inkjet ink composition may help to wet the fluoropolymer substrate when it is exposed to high temperatures.

DETAILED DESCRIPTION OF THE INVENTION

A description of example embodiments of the invention follows.

The teachings of all patents, published applications and references cited herein are incorporated by reference in their entirety.

The inkjet inks disclosed herein include a solvent, a fluoropolymer, a fluorosurfactant, and a colorant. The inkjet inks can also include a conductivity salt. The inkjet ink can also include a dispersion resin and/or a dispersant.

A wide variety of solvents are suitable for use in the inkjet ink formulations. Suitable solvents should sufficiently solubilize the fluoropolymer, fluorosurfactant, colorant, and any other additives, including a conductivity salt, dispersion resin, and dispersant. The solvent should be sufficiently polar to render enough electrical conductivity to the ink in order to allow drop deflection in an electric field. Although solvents having a relative evaporation rate greater than 1 with respect to n-butyl acetate are typically preferred, larger amounts of slower evaporating solvents can also be used. Examples of suitable solvents include, but are not limited to, ketones such as acetone, methyl ethyl ketone, diethyl ketone, methyl isobutyl ketone, and cyclohexanone; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, and methoxypropyl acetate; alcohols such as methanol, ethanol, n-propanol, isopropanol, n-butanol, t-butanol, n-pentanol, and n-hexanol; glycol ethers such as ethylene glycol monomethyl ethers, ethylene glycol monoethyl ethers, propylene glycol monomethyl ethers, and propylene glycol monoethyl ethers; glycol ether acetates such as ethylene glycol butyl ether acetate and propylene glycol methyl ether acetate; and glycols such as ethylene glycol and propylene glycol. The solvent can also be a mixture of the preceding solvents. One of skill in the art will recognize that there are other suitable solvents that meet the criteria disclosed above. One of skill in the art will understand that the exact amount or type of solvents included in the ink will vary with the demands of the given application, such as the nature of the continuous inkjet printer used. Suitable solvents can be added in amounts from about 40% to about 90% by weight. Preferably, the solvents can be added in amounts from about 65% to about 85% by weight.

Without wishing to be bound by any particular theory, it is believed that the fluoropolymer of the inkjet ink helps to wet the fluoropolymer substrate when it is exposed to elevated temperatures. Examples of suitable fluoropolymers include copolymers of a fluoroolefin monomer and a vinyl ether monomer. In one embodiment, the fluoroolefin monomer is chlorotrifluoroethylene. In another embodiment, the vinyl ether monomer is a perfluoro(alkylvinylether). The fluoropolymer can be, for example, a copolymer of chlorotrifluoroethylene and a perfluoro(alkylvinylether). Examples of other suitable fluoropolymers include poly(tetrafluoroethylene) (PTFE), poly(tetrafluoethylene-co-hexafluoropropylene) (FEP), poly(ethylene-co-tetrafluoroethylene) (ETFE), poly(tetrafluoroethylene-co-perfluorovinylether) (PFA), and poly(vinylidene fluoride) (PVDF). Still other examples of suitable fluoropolymers include the ZEFFLE LC series, which include copolymers of various acrylic monomers.

Another suitable fluoropolymer is the ZEFFLE GK series, which is a copolymer of tetrafluoroethylene and vinyl monomer.

The fluoropolymers can be polymerized from vinyl monomers. In some cases, those polymers can contain functional groups that can be further polymerized. While these polymers may sometimes be referred to as resins or oligomers, the term polymer is intended to encompass oligomers that can be further polymerized. If a thermoset is formed, as can be the case, the further polymerization can be called crosslinking.

Without wishing to be bound by any particular theory, it is believed that the fluorosurfactant of the inkjet ink provides initial wetting of the fluoropolymer substrate. Examples of suitable fluorosurfactants include a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, and fluoro-alkyl ammonium chloride. Suitable fluorosurfactants also include copolymers of fluoroalkyl acrylates. In one example, U.S. Pat. No. 4,365,049 discloses perfluoroalkyl groups having an ester bond to an acrylic copolymer. Other suitable fluorosurfactants are disclosed in U.S. Patent Publication No. 2012/0016070 is another example. Telomere-based fluorosurfactants can also be suitable, such as the perfluoroether phosphates described in U.S. Pat. Nos. 7,674,928 and 7,815,816. Particular commercial examples include S-111, S-103A, S-550, S-500, and S-106 (Chemguard, Inc., Mansfield, Tex., USA). S-111 is a perfluoro alkyl amine oxide amphoteric surfactant. S-103A is a fluoroalkyl sodium sulfonate anionic sulfonate. S-500 is another fluorinated amphoteric surfactant. S-550 is a perfluoro-ethoxylated non-ionic surfactant. S-106 is a fluoro-alkyl ammonium chloride. Traditional octylphenol ethoxylates can also be used, including Triton X-405, Triton X-15, and Triton X-101 (Dow Corning Corporation, Midland, Mich., USA). Another suitable fluorosurfactant is UNIDYNE NS-1602 (Daikin Industries, Ltd, Osaka, Japan). Still other suitable fluorosurfactants include the ZONYL line of fluorosurfactants, CAPSTONE FS-81, CAPSTONE FS-50, CAPSTONE FS-51, CAPSTONE FS-10, and CAPSTONE FS-61 (E.I. du Pont de Nemours and Company, Wilmington, Del., USA).

The colorant provides a suitable color to the inkjet ink. Suitable colorants include dyes, which are soluble, and pigments, which are not soluble. Pigments should be in a form where the particle size has been significantly reduced either through media-milling, extrusion, or some other form of particle size reduction. When the colorant is a pigment, a dispersant can be used to ensure that the pigment is stable when mixed with the other components in the system. Pigments may require a conductivity salt to ensure that the ink is sufficiently conductive. Typically, a suitable colorant should have a particle size substantially less than one micron and should be heat-stable up to approximately 400° C. for at least one minute. Suitable colorants include carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, and pigment red 178. Suitable colorants also include a black chrome complex azo dye, phthalocyanine green, phthalocyanine blue, carbon black, and titanium dioxide. In general, a chrome complex azo dye refers to a colorant pigment having an azo dye moiety complexed to a chromium metal salt to form a single molecule. One example of a black chrome complex azo dye is Solvent Black 27 (CAS # is 72812-34-1), also known as sodium bis[1-[(2-hydroxy-4-nitrophenyl)azo]-2-naphtholato(2-)]chromate(1-). Another example of a black chrome complex azo dye is Solvent Black 29, one version of which can be a mixture of four materials: sodium bis[1-[(2-hydroxy-5-nitrophenyl)azo]-2-naphtholato(2-)]chromate (1-), sodium bis[1-[[2-hydroxy-3-nitro-5-tert-pentylphenyl]azo]-2-naphtholato(2-)]chromate(1-), sodium [1-[(2-hydroxy-4-nitrophenyl)azo]-2-naphtholato(2-)][1-[(2-hydroxy-5-nitrophenyl)azo]-2-naphtholato(2-)]chromate (1-), and sodium bis[1-[(2-hydroxy-4-nitrophenyl)azo]-2-naphtholato(2-)]chromate(1-). Other chrome complex azo dyes could be used as well. While there are many companies that supply colorants, some particular suppliers include Clariant (Muttenz, Switzerland), BASF SE (Ludwigshafen, Germany), and Sun Chemical Corporation (Sun Chemical Corporation, Cincinnati, Ohio, USA). Suitable colorants also include solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, and solvent red 49, some of which are available from Orient Corporation of America, Kenilworth, N.J., USA. However, one of skill in the art will recognize that there are many additional suitable colorants satisfying the criteria outlined above and therefore can be used.

Optionally, a conductivity salt can be included to impart sufficient conductivity to the ink so that the ink can be used in a continuous inkjet printer. One of skill in the art will recognize that the exact amount or type of conductivity agent will vary with the needs of a given application. For example, different printers or printheads will have different minimum conductivity targets that need to be met. Depending on other raw materials in the ink, more or less salt can be required. For example, certain solvents can inhibit the effect of the conductivity salt, requiring that more salt be added to meet the minimum number for conductivity. Also, a certain salt can have a undesired side reaction with another component in the ink. Also, the minimum level of conductivity is more important than the maximum level. Usually, solubility of the salt or the cost of the salt prevent too much salt from being used. A minimum conductivity value of 500-750 µS/cm is usually the amount required for minimum printer operation. Thus, a conductivity greater than 1000 µS/cm is usually sufficient for most continuous inkjet printers. Some dyes have high conductivities around 2000-2500 µS/cm, in which case a conductivity salt is not necessary. Some dyes, conversely, show no conductivity or only minimal conductivity, so they require that conductivity salt be added to reach the required levels of conductivity. Pigments, in general, are not conductive, so formulations with a pigment or pigments require that conductivity salt or salts be added to meet minimum conductivity levels. Suitable conductivity salts include tetrabutylammonium nitrate, tetrabutylammonium hexafluorophosphate, and potassium thiocyanate. One of ordinary skill in the art will recognize that there are other suitable conductivity salts meeting the criteria disclosed above and that the salt can be added in an amount to impart sufficient conductivity to the ink.

Optionally, the inkjet ink can include a dispersion resin. The dispersion resin helps to prevent the viscosity from becoming too low, which would inhibit energy transfer from the mill to the slurry, and it helps to rewet the slurry if it dries. One suitable dispersion resin is a polyketone, for example a polyketone having a softening temperature of 80-95° C. In general, any low molecular weight resin could potentially be used so long as it is compatible with the other materials in the ink. For example, low molecular weight acrylic resins can be used.

Optionally, the inkjet ink can include a dispersant. Suitable dispersants include an amine functional hyperdispersant, a dispersion synergist, and a pigment synergist. Dispersants tend to be high molecular weight surface active polymers. An amine functional hyperdispersant refers to a polymer with multiple amine groups for absorption on to the pigment with non-amine side chains that extend into the solvent. The surfactant functionality tends to come from amine groups that are present on the polymer. During milling, pigment particles are separated by high shear, and the amine groups on the dispersants absorb onto the surface of the pigment particles and prevent re-agglomeration. In addition to the amine groups on the polymer, various solvent soluble chains extend in to the solvent portion of the ink to improve compatibility with the other materials in the ink. Companies have employed various strategies for creating hyper-dispersants. In one example, a poly(alkylene)imine is attached to a polyester chain by an amide link as described in U.S. Pat. No. 4,224,212. For a different approach, polyisocyanate has been reacted with various function molecules, including, but not limited to, long chain and cyclic alcohol and carboxylic acid as, as described in U.S. Pat. No. 4,942,213. In a different approach, polymers with acrylic ester groups are reacted with amines to form CONH groups in the polymer. Examples are disclosed in U.S. Pat. Nos. 6,596,816 and 7,432,329. Examples include SOLSPERSE 32,000, SOLSPERSE 36,000, and SOLSPERSE 56,700 (Lubrizol, Wickliffe, Ohio, USA); DISPERBYK 163, DISPERBYK 20001, and BYK-JET 9130 (BYK USA Inc., Wallingford, Conn., USA); and EFKA 4401, EFKA 7701, EFKA 4310, EFKA 4320, EFKA 4330, and EFKA 4340 (BASF SE, Ludwigshafen, Germany). A dispersion synergist is a modified pigment chromophore with functional side chains that extend into the solvent. Suitable dispersion synergists include a modified phthalocyanine with alkyl side chains such as described in U.S. Pat. No. 4,057,436. Pigment synergists tend to be alternative forms of the pigment that are modified so that they are both compatible with the pigment surface and with the other ingredients in the ink. In general, synergists contain a portion that closely resembles the chromophore of the pigment and another portion that interacts solubilizes in the solvent. For example, when a pigment contains phthalocyanine groups, the phthalocyanine portion of the synergist may interact with the pigment. The synergist can then have carbon chains that extend into the solvent (i.e., a portion that is readily soluble in the chosen organic solvent). An exemplary pigment synergist is disclosed in U.S. Pat. No. 4,057,436, which is a substituted ammonium salt of a colored acid where the colored acid is a phthalocyanine. Another exemplary pigment synergist is disclosed in U.S. Pat. No. 4,313,766. Another type of a synergist is a substituted azo compound as described in U.S. Pat. No. 3,532,520. Another type of synergist is an alkyl derivative of a polycyclic compound that is described in U.S. Pat. No. 4,294,620. Specific pigment synergists also include SOLSPERSE 5000, SOLSPERSE 22,000, and SOLSPERSE 12,000 (Lubrizol, Wickliffe, Ohio, USA); and EFKA 6745, and EFKA 6750 (BASF SE, Ludwigshafen, Germany).

In general, an inkjet ink can be made as follows. First, the solvent is added to a mixer, which can be stirred at approximately 1,500 RPM. Then, the fluoropolymer, fluorosurfactant, and colorant are added. If the colorant is a pigment, the particle size should be reduced either through media-milling, extrusion, or some other form of particle size reduction. In addition, the small particle size pigment should be stable when mixed with the other components in the system. Optionally, a conductivity salt can be added. Optionally, a dispersion resin and/or a dispersant are added. In general, the components can be added an any suitable order. Everything is mixed for approximately 30 minutes, although only a few minutes of mixing can be sufficient. The resulting mixture is filtered. Typically, the filter can have a pore size ranging from a half micron to twenty microns. The filtered mixture is then loaded into an inkjet printer, printed onto a fluoropolymer substrate, and cured.

One of skill in the art will recognize that the curing temperatures and times will depend on the type of fluoropolymer and the size of the fluoropolymer. In general, higher temperatures can allow for shorter current times, and larger samples could require longer curing times or higher temperatures. PTFE can require 5-10 minutes or longer at 350° C., or 1-3 minutes at 400° C., or 30 seconds to one minute at 500° C. At temperatures higher than 650° C., PTFE can cure in a few seconds. FEP can require two minutes at temperatures of at least 300° C., or roughly one minute at 400° C. ETFE can require at least one minute at 300° C. Each of the preceding values pertains to fluoropolymer samples that are 1.5 inch by inch by 0.2 inch. In some instances, a PTFE substrate can be cured at about 400° C. for about 3 minutes. Without wishing to be bound by any particular theory, the fluoropolymer substrate should reach a temperature above its melt point or sintering point in order to ensure sufficient curing. Although the ink may be referred to as "bonded" to the fluoropolymer substrate, we simply mean that the ink is difficult to remove with physical, abrasive force and do not imply that a chemical bond has formed.

Experimental Testing Protocol: Durability Testing

Durability testing: Durability testing was performed according to United States Military Specification MIL-W-22759E, Section 4.6.3.4, which is incorporated herein by reference in its entirety. The durability of product identification or color markings applied to the wire for coding is evaluated at 20° C. to 25° C. as follows.

Durability testing apparatus: The markings durability tester was designed to hold a short specimen of finished wire firmly clamped in a horizontal position with the upper longitudinal surface of the specimen fully exposed. The instrument was capable of rubbing a small cylindrical mandrel, which was a sewing needle 0.025±0.002 inches in diameter, repeatedly over the upper surface of the wire in such position that the longitudinal axes of the mandrel and the specimen are at right angles to each other with cylindrical surfaces in contact. A weight affixed to a jig above the mandrel controls the thrust normal to the surface of the insulation. A motor driven reciprocating cam mechanism and counter delivers an accurate number of abrading strokes in a direction parallel to the axis of the specimen. The length of the stroke was ⅜ inch and the frequency of the stroke was 120 strokes (60 stroking cycles) per minute.

Durability testing procedure: In performing the test, a specimen of finished wire was mounted in the specimen clamp and the jig was adjusted to deliver a weight of 500 grams through the abrading mandrel to the markings on the insulation. The specimen was subjected to 125 abrasion cycles (250 strokes) of the mandrel and then examined. If there is a continuous line of erasure or obliteration through the stripe, band or printed identification marking, exposing the primary insulation, the specimen shall be considered as having failed.

Experimental Testing Protocol: Tape Test

A piece of clear scotch tape from 3M was applied to the surface on which the ink has been applied. Force was then used to remove the tape from the substrate. The surface and the tape were evaluated. If the ink drops were removed from the substrate, then the ink failed the test. The tape test is adapted from ASTM D 3359-02, which is incorporated by reference herein in its entirety.

Experimental Testing Protocol: Scratch Test

A fingernail was used to scratch the surface of a substrate to which the ink has been applied. If the ink drops were removed from the substrate, then the ink failed the test. If the drops resisted removal from the substrate, then it passed the test.

Experiment #1: Solvent-Based Ink Black Dye #1

A batch of 200 grams of ink was made in this example. Add 144 grams of methyl ethyl ketone to a mixer. Stir at 1,500 RPM. Add 2 grams of tetrabutylammonium hexafluorophosphate to mixer. Add 40 grams of ZEFFLE GK-500 (Daikin Industries, Ltd, Osaka, Japan) to the mixer. Add 14 grams of VALIFAST 3820 (Orient Corporation of America, Kenilworth, N.J., USA) to the mixer. VALIFAST 3820 is a chrome complex azo dye that is also sold under CAS #72812-34-1, and its chemical name is sodium bis[1-[(2-hydroxy-4-nitrophenyl)azo]-2-naphtholato(2-)]chromate(1-). Mix for 30 minutes. Filter through a WHATMAN GF/D filter (GE Healthcare UK Limited, Little Chalfont, Buckinghamshire, United Kingdom) Life Sciences, Piscataway, N.J., USA). After filtration, the viscosity was 3.25 cP measured by a Brookfield DU2 Adapter at 25.0° C. at 60 RPM. The density was 7.38 lb/gal. The conductivity was 1645 µS/cm. Load ink into an EVO 70 Micron Print rig (KBA-Metronic GmbH, Veitshoechheim, Germany). Print a test message onto flat PTFE stock from McMaster Can (Robbinsville, N.J., USA). Load the panel into a 400° C. oven, and cook for three minutes. The ink passed the scratch test.

Experiment #2: Solvent-Based Ink Black Dye #2

A batch of 300 grams of ink was made in this example. Add 216 grams of methyl ethyl ketone to a mixer. Stir at 1,500 RPM. Add 3 grams of tetrabutylammonium hexafluorophosphate to mixer. Add 60 grams of ZEFFLE GK-510 (Daikin Industries, Ltd, Osaka, Japan) to the mixer. Add 21 grams of VALIFAST 3820 (Orient Corporation of America, Kenilworth, N.J., USA). Mix for 30 minutes. Filter through a WHATMAN GF/D filter (GE Healthcare Life Sciences, Piscataway, N.J., USA). After filtration, the viscosity was 2.73 cP measured by a Brookfield DU2 Adapter at 25.0° C. at 60 RPM. The density was 7.33 lb/gal, and the conductivity was 1582 µS/cm. Load ink into an EVO 70 Micron Printer (KBA-Metronic GmbH, Veitshoechheim, Germany). Print a test message onto flat PTFE panel from McMaster Carr. Load the panel into a 400° C. oven, and cook for three minutes. The ink passed the scratch test.

Experiment #3: Solvent-Based Ink Black

A batch of 200 grams of ink was made in this example. Add 139 grams of methyl ethyl ketone to a CM100 Melton Mixer. Set mixer at 1,500 RPM. Add 3 grams of tetrabutylammonium hexafluorophosphate to the mixer. Add 44 grams of ZEFFLE GK-570 to the mixer. Add 14 grams of VALIFAST 3820 to the mixer. Mix the batch for an additional 30 minutes. After mixing, filter the batch through a 47 mm WHATMAN 1 micron GF/B filter. After filtration, the viscosity was measured as 2.20 cP from a Brookfield UL Adapter at 60 RPM at 25.0° C. Codes were printed with a 70 micron ALPHAJET EVO AJD print rig (KBA-Metronic GmbH, Veitshoechheim, Germany). The KBA printer has been modified so that external pressure is supplied to direct the ink through the print head. The ink never recirculates inside the printer. Once the ink reaches the printhead, it is vibrated by the piezo-electric crystal, and charged like any other ink. This setup is used for experimental purposes because it allows for smaller volumes of ink to be run than is used in a traditional printer. Samples were heated at 400° C. for 1 and 2 minutes, and the code did not fully adhere under either circumstances. The sample failed the scratch test and the tape test.

Experiment #4: Solvent-Based Ink Black Dye #2

A batch of 1,000 grams of ink was made in this example. Add 660 grams of methyl ethyl ketone to a CM100 Melton mixer. Mix solvent at 1,500 RPM. Add 15 grams of tetrabutylammonium hexafluorophosphate to the batch and wait for the salt to dissolve. Add 250 grams of ZEFFLE GK-570 (Daikin Industries, Ltd, Osaka, Japan) to the batch. Wait five minutes for the resin to mix in. Add 70 grams of VALIFAST 3820 to the batch. Add 5 grams of UNIDYNE NS-1602 (Daikin Industries, Ltd, Osaka, Japan) to the batch. Mix for 30 minutes at 1,500 RPM. Filter the ink through a 47 mm WHATMAN GF/B filter. Load the ink into a 70 micron Alphajet D EVO printer (KBA Metronic GmbH, Veitshoechheim, Germany). Make a 7 drop print on a piece of PTFE (McMaster-Carr) and cook at 400° C. for 3 minutes.

Experiment #5-1: Solvent-Based Green Ink

The phthalocyanine green pigment dispersion was prepared as follows. Add 450 grams of propylene glycol methyl ether acetate to a CM100 Melton mixer. Add 100 grams of LAROPAL A-81 resin (BASF SE, Ludwigshafen, Germany), which is a polyketone. Add 250 grams of EFKA 4340 (BASF SE, Ludwigshafen, Germany). Mix for 30 minutes at 1,500 RPM. Add 200 grams of phthalo green pigment 264-3100 (Sun Chemical). Mix for 30 minutes at 1,500 RPM. Add batch to an Eiger Mini Motor Mill 100 with 0.8 mm zirconia media. Mill the batch for 1 hour at 4,000 RPM.

One thousand grams of ink was made. Add 632.5 grams of methyl ethyl ketone to a CM100 Melton mixer. Add 15 grams of tetra-n-butylammonium hexafluorophosphate to the batch. Wait for the salt to dissolve. Add 100 grams of the phthalocyanine green pigment dispersion to the batch. Mix the batch for 5 minutes at 1,500 RPM. Add 250 grams of UNIDYNE GK-570 (Daikin) to the batch. Mix for 30 minutes at 1,500 RPM. Filter the ink through a 47 mm WHATMAN GF/B filter. Load the ink into a 70 micron Alphajet D EVO printer (KBA Metronic GmbH, Veitshoechheim, Germany). Make a 7 drop print on a piece of PTFE (McMaster-Carr) and cook at 400° C. for 3 minutes.

Experiment #5-2: Solvent-Based Green Ink

The phthalocyanine green pigment dispersion was prepared as follows. Add 450 grams of propylene glycol methyl ether acetate to a CM100 Melton mixer. Add 100 grams of LAROPAL A-81 resin (BASF SE, Ludwigshafen, Germany), which is a polyketone. Add 250 grams of EFKA 4340 (BASF SE, Ludwigshafen, Germany) Mix for 30 minutes at 1,500 RPM. Add 200 grams of phthalo green pigment 264-3100 (Sun Chemical). Mix for 30 minutes at 1,500 RPM. Add batch to an Eiger Mini Motor Mill 100 with 0.8 mm zirconia media. Mill the batch for 1 hour at 4,000 RPM.

Two hundred grams of ink were made. Add 137 grams of methyl ethyl ketone to a CM100 Melton mixer. Add 3 grams of tetra-n-butylammonium hexafluorophosphate to the batch. Wait for the salt to dissolve. Add 20 grams of the phthalocyanine green pigment dispersion to the batch. Mix the batch for 5 minutes at 1,500 RPM. Add 40 grams of UNIDYNE GK-570 (Daikin) to the batch. Mix for 30 minutes at 1,500 RPM. Filter the ink through a 47 mm WHATMAN GF/B filter. Load the ink into an EVO modified print rig (KBA Metronic GmbH, Veitshoechheim, Germany). The KBA printer has been modified so that external pressure is supplied to direct the ink through the print head. The ink never recirculates inside the printer. Once the ink reaches the printhead, it is vibrated by the piezo-electric crystal, and charged like any other ink. This setup is used for experimental purposes because it allows for smaller volumes of ink to be run than is used in a traditional printer. A #10 drawdown with a wire bar from the Pall Gardener company on 1.5 inch by 3.5 inch piece of PTFE. The ink was cured at 400° C. for 3 minutes. The drawdown failed both the adhesion test and the scratch test. This ink had also had stability problems where the green pigment settled at the bottom of the container after a few days. The viscosity at 25.0° C. at 60 RPM on a Brookfield UL Adapter was 3.45 cP. The density was 7.20 lb/gal, and the conductivity was 1081 µS/cm.

Experiment #6: Solvent Based Green Ink

A batch of 600 grams of pigment dispersion was made first in this example. Add 291 grams of propylene glycol monomethyl ether acetate to a Melton CM-100 mixer. Add 60 grams of LAROPAL A-81 to the mixer and mix at 1,500 RPM to start dissolving the resin. Add 120 grams of EFKA 4340 to the mixer. Add 9 grams of SOLSPERSE 5000. Add 120 grams of phthalogreen pigment 264-3100 (Sun Chemical). Continue mixing for thirty minutes at 1,500 RPM. Add the 600 grams of pigment dispersion to an Eiger Mini Motor Mill 100 with 0.8 mm Zirconia media. Mill the batch for three hours at 4,000 RPM.

Seven hundred grams of ink was made in this example. Add 441 grams of methyl ethyl ketone to the Melton CM-100 mixer and stir at 1,500 RPM. Add 10.5 grams of tetrabutyl ammonium hexafluorophosphate to the batch. Add 105 grams of LUMIFLON LF710F (Asahi Glass Co., Ltd., Tokyo, Japan) were added to the batch. Add 140 grams of the pigment dispersion from the previous paragraph to the mixer. Add 3.5 grams of UNIDYNE NS-1602 to the ink. Filter the ink through a 1 micron filter (Part No. MACWY0103, Pall Corporation, Port Washington, N.Y., USA). The viscosity of the ink was 4.69 cP at 25.0° C. The density was 7.65 lb/gal. The conductivity was 998 µS/cm3. After filtering, the ink was loaded into a 55 micron Alphajet AJC (KBA Metronic GmbH, Veitshoechheim, Germany). Codes were printed on a 1.5 inch by 3.5 inch by 0.20 inch PTFE substrate from Boedecker Plastics. The PTFE was cooked for 3 minutes at 400° C. After the PTFE was cooled, it was tested according to MIL-W-227598E. After the 125 cycles of MIL-W-227598E, the code was not removed. Likewise, the code was not removed with a tape test or a fingernail scratch.

Experiment #7: Black Ink

Figure 1:
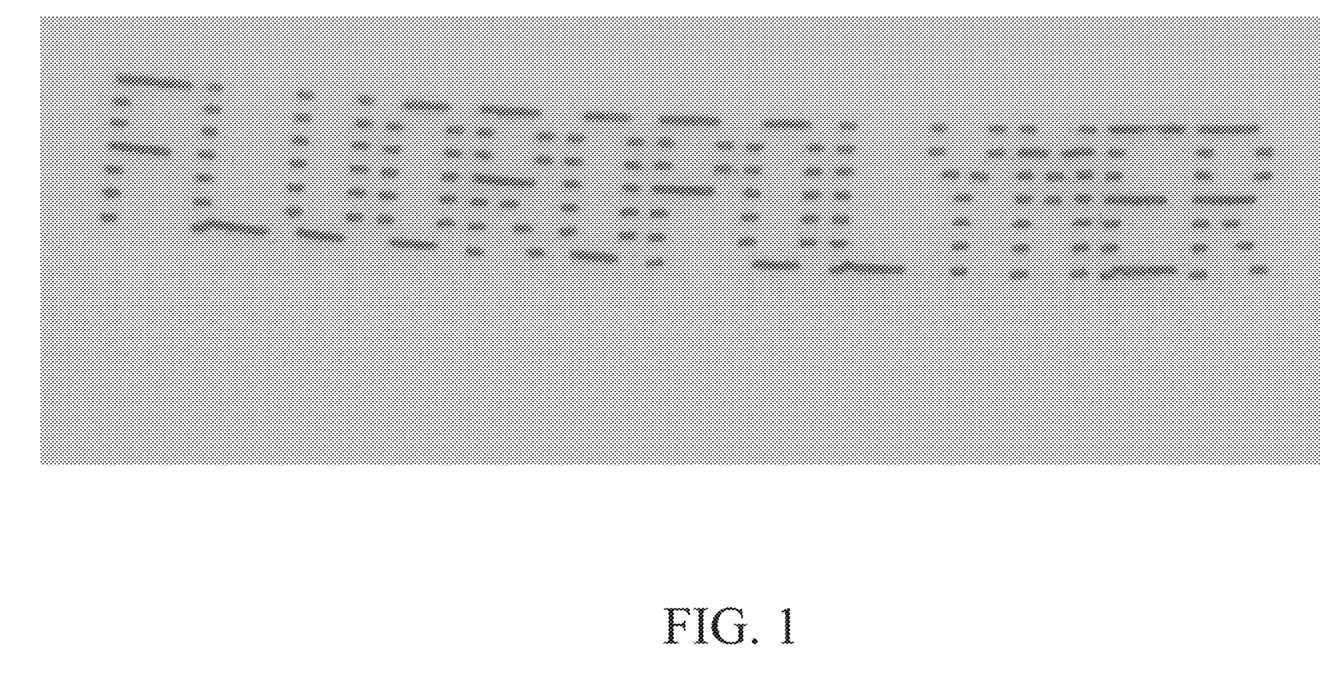
FIG. 1 is an image of the ink of Experiment #7 printed on a 1.5 inch by 3 inch by 0.20 inches PTFE substrate (Boedecker Plastics).

A batch of 1,800 grams of ink was made in this example. Add 1,108 grams of methyl ethyl ketone to a Melton CM 100 mixer and stir at 1,500 RPM. Add 27 grams of tetrabutyl ammonium hexafluorophosphate to the mixer. Add 450 grams of ZEFFLE GK-570 were added to the mixer. Add 126 grams of VALIFAST Black 3820 to the mixer. Add 9 grams of UNIDYNE NS-1602 to the mixer. The batch was mixed for an additional 30 minutes and filtered with a one micron filter (Pall Corporation, Port Washington, N.Y., USA). The viscosity was measured as 2.69 cP with Brookfield UL adapter at 60 RPM 25° C. The density was 7.29 lb/gal, and the conductivity was 1468 µS/cm. The ink was loaded into a 42 micron Alphajet AJD PICO (KBA Metronic GmbH, Veitshoechheim, Germany). FIG. 1 is an image of a code that was printed on a 1.5 inch by 3 inch by 0.20 inches PTFE substrate (Boedecker Plastics). The panel with the code was cooked for one minute at 400° C. After the panel cooled, it was tested according to MIL-W-227598E. The code was not removed at 125 abrasion cycles, so it was judged to have passed the test. Likewise, the code was not removed with the tape test or a fingernail scratch.

Experiment #8: Solvent-Based Black Inkjet Ink

A batch of 230 grams of ink was made in this example. Add 128.8 grams of methyl ethyl ketone to a Melton CM-100 mixer and stir at 1,500 RPM. Add 30 grams of n-butyl acetate to the mixer. Add 4.5 grams of tetrabutyl ammonium hexafluorophosphate to the mixer. Add 60 grams of LUMIFLON LF710F (Asahi Glass Co., Ltd., Tokyo, Japan) to the mixer. Add 21 grams of VALIFAST 3820 to the mixer. Add 2.7 grams of UNIDYNE NS-9013 to the mixer. Add 40 grams of methyl ethyl ketone to the batch. Mix the batch for 30 minutes. After mixing, the ink was filtered through a 47 mm 1 micron WHATMAN GF/B Filter. The ink was then run on a Alphajet AJD EVO 70 micron print rig. A code was printed on a 1.5 inch by 3 inch by 0.20 inch PTFE substrate (Boedecker Plastics). The panel with the code was cooked for one minute at 400° C. After the panel cooled, it was tested according to MIL-W-227598E. The code was not removed at 125 abrasion cycles, so it was judged to have passed the test. Likewise, it was not removed with the tape test or a fingernail scratch.

Experiment #9: Solvent Based Green Ink

This comparative example contains only a fluorosurfactant, but does not include a fluoropolymer. A batch of 100 grams of ink was made in this experiment. Add 56 grams of methyl ethyl ketone to a Melton CM-100 mixer and mix at 700 RPM. Add 2 grams of tetrabutyl ammonium hexafluorophosphate to the batch. Add 20 grams of the green dispersion of Experiment #6 to the batch. Add 20 grams of VARCUM 29108 from Durez (Sumitomo Bakelite North America, Novi, Mich., USA) to the batch. Add 2 grams of UNIDYNE 9013 were added to the batch. Mix the batch for 30 minutes. After 30 minutes, the ink was applied to a 1.5 inch by 3 inch by 0.20 inch PTFE substrate (Boedecker Plastics). The ink was applied with a #10 drawdown bar from the Pall-Gardener company. The ink wet out the plastic panel. The substrate with the applied ink was cooked at 400° C. The coating was removed with a fingernail scratch, so it was judged to have poor adhesion.

Experiment #10: Solvent Based Black Ink

Figure 2:
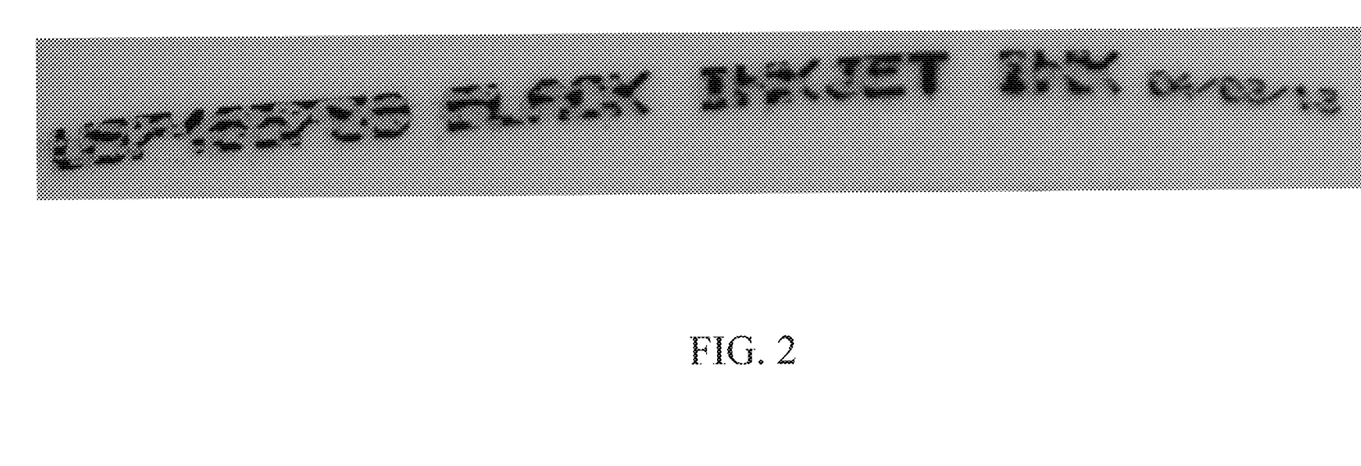
FIG. 2 is an image of the ink of Experiment #10 printed on a fluoropolymer substrate.

This comparative example does not include a fluorosurfactant. A batch of 200 grams of the following ink corresponding U.S. Pat. No. 7,465,759 was made. 116 grams of acetone were added to a Melton CM-100 mixer. The mixer was stirred at 700 RPM. 1.8 grams of tetrabutyl ammonium hexafluorophosphate were added to the mixer. 42.8 grams of Vitel 5833B (Bostik, Mass.) were added to the batch. 10 grams of Solvent Black 27 were added to the batch. 0.2 grams of Zonyl FSO (Dupont, Del.) were added to the batch. The batch was mixed for thirty minutes. Evaporation of acetone was checked, and acetone was added such that the total amount of material in the vessel was 170 grams. 30 grams of parachlorobenzotrifluoride were added. The batch was filtered through a 1 mm Pall Filter. The viscosity from the Brookfield DVII UL Adapter at 25.0° C. at 60 RPM was 4.12 cP. The density was 7.95 lb/gal. The conductivity was 1223 µS/cm. The ink was loaded into a 70 micron Alphajet AJD EVO printing from KBA-Metronic. FIG. 2 is an image printed on a fluoropolymer substrate, which shows poor wetting.

While this invention has been particularly shown and described with references to example embodiments thereof, it will be understood by those skilled in the art that various changes in form and details may be made therein without departing from the scope of the invention encompassed by the appended claims. For example, while the invention has been particularly described with respect to fluoropolymer wires, it is applicable to other products, such as those where PTFE powder is sintered or where fluoropolymers are heated after production

What is claimed is:

1. An inkjet ink composition, comprising:
   a) a solvent;

b) a copolymer of a fluoroolefin monomer and a perfluoro (alkylvinylether) monomer;
c) a fluorosurfactant; and
d) a colorant.

2. The inkjet ink composition of claim 1, wherein the solvent includes at least one member selected from the group consisting of methyl ethyl ketone, n-butyl acetate, and propylene glycol methyl ether acetate.

3. The inkjet ink composition of claim 1, further including a conductivity salt.

4. The inkjet ink composition of claim 3, wherein the conductivity salt includes at least one member selected from the group consisting of tetrabutyl ammonium nitrate, tetrabutyl ammonium hexafluorophosphate, and potassium thiocyanate.

5. The inkjet ink composition of claim 1, wherein the colorant includes at least one member selected from the group consisting of a black chrome complex azo dye, phthalocyanine green, phthalocyanine blue, carbon black, and titanium dioxide.

6. The inkjet ink composition of claim 1, wherein the colorant includes at least one member selected from the group consisting of carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70.

7. The inkjet ink composition of claim 1, wherein the fluoroolefin monomer is chlorotrifluoroethylene.

8. The inkjet ink composition of claim 1, wherein the fluorosurfactant includes at least one member selected from the group consisting of a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated non-ionic surfactant, and a fluoro-alkyl ammonium chloride.

9. The inkjet ink composition of claim 1, further comprising a dispersion resin.

10. The inkjet ink composition of claim 9, wherein the dispersion resin is a polyketone.

11. The inkjet ink composition of claim 1, further comprising a dispersant.

12. The inkjet ink composition of claim 11, wherein the dispersant includes at least one member selected from the group consisting of an amine functional hyperdispersant, a dispersion synergist, and a pigment synergist.

13. The inkjet ink composition of claim 1, wherein the solvent is present in a range of between about 40% to about 90% by weight of the inkjet ink composition.

14. The inkjet ink composition of claim 1, wherein the fluoropolymer is present in a range of between about 5% to about 40% by weight of the inkjet ink composition.

15. The inkjet ink composition of claim 1, wherein the fluorosurfactant is present in a range of between about 0.5% to about 5% by weight of the inkjet ink composition.

16. The inkjet ink composition of claim 1, wherein the colorant is present in a range of between about 5% to about 30% by weight of the inkjet ink composition.

17. The inkjet ink composition of claim 3, wherein the conductivity salt is present in a range of between about 1% to about 5% by weight of the inkjet ink composition.

18. The inkjet ink composition of claim 9, wherein the dispersion resin is present in a range of between about 0.1% to about 20% by weight of the inkjet ink composition.

19. The inkjet ink composition of claim 11, wherein the dispersant is present in a range of between about 0.1% to about 10% by weight of the inkjet ink composition.

20. A method of making an inkjet ink, comprising the steps of:
a) mixing:
i) a solvent;
ii) a copolymer of a fluoroolefin monomer and a perfluoro(alkylvinylether) monomer;
iii) a fluorosurfactant; and
iv) a colorant; and
b) filtering the mixture.

21. The method of claim 20, wherein the solvent includes at least one member selected from the group consisting of methyl ethyl ketone, n-butyl acetate, and propylene glycol methyl ether acetate.

22. The method of claim 20, further comprising mixing a conductivity salt.

23. The method of claim 22, wherein the conductivity salt includes at least one member selected from the group consisting of tetrabutyl ammonium nitrate, tetrabutyl ammonium hexafluorophosphate, and potassium thiocyanate.

24. The method of claim 20, wherein the colorant includes at least one member selected from the group consisting of a black chrome complex azo dye, phthalocyanine green, phthalocyanine blue, carbon black, and titanium dioxide.

25. The method of claim 20, wherein the colorant includes at least one member selected from the group consisting of carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70.

26. The method of claim 20, wherein the fluoroolefin monomer is chlorotrifluoroethylene.

27. The method of claim 20, wherein the fluorosurfactant includes at least one member selected from the group consisting of a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated non-ionic surfactant, and a fluoro-alkyl ammonium chloride.

28. The method of claim 20, further comprising a dispersion resin.

29. The method of claim 28, wherein the dispersion resin is a polyketone.

30. The method of claim 20, further comprising a dispersant.

31. The method of claim 30, wherein the dispersant includes at least one member selected from the group consisting of an amine functional hyperdispersant, a dispersion synergist, and a pigment synergist.

32. The method of claim 20, wherein the solvent is present in a range of between about 40% to about 90% by weight of the inkjet ink composition.

33. The method of claim 20, wherein the fluoropolymer is present in a range of between about 5% to about 40% by weight of the inkjet ink composition.

34. The method of claim 20, wherein the fluorosurfactant is present in a range of between about 0.5% to about 5% by weight of the inkjet ink composition.

35. The method of claim 20, wherein the colorant is present in a range of between about 5% to about 30% by weight of the inkjet ink composition.

36. The method of claim 22, wherein the conductivity salt is present in a range of between about 1% to about 5% by weight of the inkjet ink composition.

37. The method of claim 28, wherein the dispersion resin is present in a range of between about 0.1% to about 20% by weight of the inkjet ink composition.

38. The inkjet ink composition of claim 20, wherein the dispersant is present in a range of between about 0.1% to about 10% by weight of the inkjet ink composition.

39. A method of printing on a fluoropolymer substrate, comprising the steps of:
   a) vibrationally generating drops of an inkjet ink;
   b) deflecting the inkjet ink drops onto a substrate, wherein the inkjet ink comprises:
      i) a solvent;
      ii) a copolymer of a fluoroolefin monomer and a perfluoro(alkylvinylether) monomer;
      iii) a fluorosurfactant; and
      iv) a colorant; and
   c) curing the inkjet ink on the fluoropolymer substrate.

40. The method of claim 39, wherein the fluoropolymer substrate includes PTFE, FEP, PVDF, or ETFE, or copolymers of tetrafluoroethylene.

41. The method of claim 39, wherein the step of curing comprises heating the fluoropolymer substrate.

42. The method of claim 41, wherein the inkjet ink is cured at about 400° C. for about 3 minutes.

43. The method of claim 41, wherein the inkjet ink is cured between about 300° C. and about 650° C. for about between about 30 seconds to about 10 minutes.

44. The method of claim 39, wherein the solvent includes at least one member selected from the group consisting of methyl ethyl ketone, n-butyl acetate, and propylene glycol methyl ether acetate.

45. The method of claim 39, wherein the inkjet ink further comprises a conductivity salt.

46. The method of claim 45, wherein the conductivity salt includes at least one member selected from the group consisting of tetrabutyl ammonium nitrate, tetrabutyl ammonium hexafluorophosphate, and potassium thiocyanate.

47. The method of claim 39, wherein the colorant includes at least one member selected from the group consisting of a black chrome complex azo dye, phthalocyanine green, phthalocyanine blue, carbon black, and titanium dioxide.

48. The method of claim 39, wherein the colorant includes at least one member selected from the group consisting of carbon black, titanium dioxide, pigment green 7, pigment blue 15:1, pigment blue 15:2, pigment blue 15:3, pigment blue 15:4, pigment red 254, pigment blue 60, pigment violet 37, pigment yellow 74, pigment yellow 83, pigment red 202, pigment orange 64, pigment red 178, solvent black 3, solvent black 5, solvent black 7, solvent orange 22, solvent yellow 14, solvent yellow 16, solvent yellow 29, solvent yellow 30, solvent yellow 56, solvent blue 5, solvent red 3, solvent red 18, solvent red 24, solvent red 27, solvent red 35, solvent red 49, solvent black 27, solvent black 29, solvent black 34, solvent red 8, solvent red 122, solvent red 132, solvent red 218, solvent blue 38, and solvent blue 70.

49. The method of claim 39, wherein the fluoroolefin monomer is chlorotrifluoroethylene.

50. The method of claim 39, wherein the fluorosurfactant includes at least one member selected from the group consisting of a fluroalkyl acrylate, a fluorinated carboxylic acid or salt thereof, a fluorinated phosphate salt, a perfluoroiodide, perfluoro alkyl amine oxide, fluoroalkyl sodium sulfonate, perfluoro-ethoxylated nonionic surfactant, a fluoro-alkyl ammonium chloride, a perfluoro alkyl amine oxide amphoteric surfactant, a fluoroalkyl sodium sulfonate anionic sulfonate, a fluorinated amphoteric surfactant, a perfluoro-ethoxylated non-ionic surfactant, and a fluoro-alkyl ammonium chloride.

51. The method of claim 39, further comprising a dispersion resin.

52. The method of claim 51, wherein the dispersion resin is a polyketone.

53. The method of claim 39, further comprising a dispersant.

54. The method of claim 53, wherein the dispersant includes at least one member selected from the group consisting of an amine functional hyperdispersant, a dispersion synergist, and a pigment synergist.

55. The method of claim 39, wherein the solvent is present in a range of between about 40% to about 90% by weight of the inkjet ink composition.

56. The method of claim 39, wherein the fluoropolymer is present in a range of between about 5% to about 40% by weight of the inkjet ink composition.

57. The method of claim 39, wherein the fluorosurfactant is present in a range of between about 0.5% to about 5% by weight of the inkjet ink composition.

58. The method of claim 39, wherein the colorant is present in a range of between about 5% to about 30% by weight of the inkjet ink composition.

59. The method of claim 45, wherein the conductivity salt is present in a range of between about 1% to about 5% by weight of the inkjet ink composition.

60. The method of claim 51, wherein the dispersion resin is present in a range of between about 0.1% to about 20% by weight of the inkjet ink composition.

61. The method of claim 53, wherein the dispersant is present in a range of between about 0.1% to about 10% by weight of the inkjet ink composition.

* * * * *

UNITED STATES PATENT AND TRADEMARK OFFICE
CERTIFICATE OF CORRECTION

| | | |
|---|---|---|
| PATENT NO. | : 9,080,070 B2 | Page 1 of 1 |
| APPLICATION NO. | : 13/856401 | |
| DATED | : July 14, 2015 | |
| INVENTOR(S) | : Adam Paiz and Rick A. Elmer | |

It is certified that error appears in the above-identified patent and that said Letters Patent is hereby corrected as shown below:

In the Claims

Column 17, Claim 38, line 26, delete "inkjet ink composition" and insert -- method --

Signed and Sealed this
Seventeenth Day of November, 2015

Michelle K. Lee
*Director of the United States Patent and Trademark Office*